United States Patent
Hutchinson et al.

(10) Patent No.: US 6,532,326 B1
(45) Date of Patent: Mar. 11, 2003

(54) TRANSVERSE-LONGITUDINAL INTEGRATED RESONATOR

(75) Inventors: Donald P. Hutchinson, Knoxville, TN (US); Marcus L. Simpson, Knoxville, TN (US); John T. Simpson, Knoxville, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 68 days.

(21) Appl. No.: 09/667,178

(22) Filed: Sep. 21, 2000

(51) Int. Cl.⁷ .................................................. G02B 6/34
(52) U.S. Cl. ........................................... 385/37; 385/12
(58) Field of Search .............................. 385/12, 47, 48, 385/129–132

(56) References Cited

U.S. PATENT DOCUMENTS

| | | | |
|---|---|---|---|
| 5,216,680 A | | 6/1993 | Magnusson et al. |
| 5,682,401 A | * | 10/1997 | Joannopoulos et al. ....... 372/92 |
| 5,684,817 A | * | 11/1997 | Houdre et al. ................. 372/45 |
| 5,838,870 A | * | 11/1998 | Soref .......................... 257/347 |
| 5,852,688 A | | 12/1998 | Brinkman et al. |
| 5,907,427 A | | 5/1999 | Scalora et al. |
| 6,028,693 A | | 2/2000 | Fork et al. |
| 6,035,089 A | * | 3/2000 | Grann et al. ................. 372/102 |
| 6,215,928 B1 | * | 4/2001 | Friesem et al. ............. 372/102 |

FOREIGN PATENT DOCUMENTS

WO     WO 00/10040     2/2000

OTHER PUBLICATIONS

Laso et al., "Multiple-Frequency-Tuned Photonic Bandgap Microstrip Structures", IEEE Microwave and Guided Wave Letters, vol. 10, No. 6, Jun. 2000, pp. 220–222.*

Smith et al., "Two-dimensional photonic bandgap mirrors for in-plane microcavities", Lasers and Electro-Optics Socirty Annual Meeting, 1998, LEOS '98, IEEE, Dec. 1998, vol. 1, pp. 20–21.*

Joannopoulos, et al., "Photonic crystals: putting a new twist on light," Nature, 386, 143–149, 1997.

Foresi, et al., "Photonic-bandgap microcavities in optical waveguides," Nature, 390, 143–145, 1997.

D. Labilloy et al., "Demonstration of cavity mode between two-dimensional photonic-crystal mirrors," Electronics Letters, IEE Stevenage, GB, vol. 33, No. 23 (Nov. 6, 1997).

H. Benisty et al., "Optical and Confinement Properties of Two-Dimensional Photonic Crystals," Journal of Lightwave Technology, vol. 17, No. 11, pp. 2063–1077 (Nov. 1999).

R.M. De La Rue, et al., "Terahertz frequency regime waveguide photonic micostructures for electro-optic modulation," IEEE Sixth International Conference on Leeds, UK, pp. 106–109 (Sep. 1998).

* cited by examiner

*Primary Examiner*—Akm E. Ullah
*Assistant Examiner*—Michelle R. Connelly-Cushwa
(74) *Attorney, Agent, or Firm*—Akerman Senterfitt

(57) ABSTRACT

A transverse-longitudinal integrated optical resonator (TLIR) is disclosed which includes a waveguide, a first and a second subwavelength resonant grating in the waveguide, and at least one photonic band gap resonant structure (PBG) in the waveguide. The PBG is positioned between the first and second subwavelength resonant gratings. An electro-optic waveguide material may be used to permit tuning the TLIR and to permit the TLIR to perform signal modulation and switching. The TLIR may be positioned on a bulk substrate die with one or more electronic and optical devices and may be communicably connected to the same. A method for fabricating a TLIR including fabricating a broadband reflective grating is disclosed. A method for tuning the TLIR's transmission resonance wavelength is also disclosed.

47 Claims, 8 Drawing Sheets

TRANSVERSE-LONGITUDINAL INTEGRATED RESONATOR

STATEMENT REGARDING FEDERALLY SPONSORED RESEARCH OR DEVELOPMENT

The United States Government has rights in this invention pursuant to Contract No. DE-AC05-OOOR22725 between the United States Department of Energy and UT-Battelle, LLC.

FIELD OF THE INVENTION

This invention relates generally to optical devices, and more particularly to photonic band gap structures and subwavelength grating structures.

BACKGROUND OF THE INVENTION

Light has several advantages over the electron. As used herein, "light" means not only signals in the spectrum of visible light, but also signals in the full spectrum of frequencies typically handled by optical transmission systems. The speed of light is approximately three orders of magnitude higher, compared to the speed of electrons in semiconductors. Thus, photons of light can theoretically carry information approximately 1,000 times faster than electrons in semiconductors. Moreover, photons are not as strongly interacting as electrons with their environment, which allows photonic devices to dissipate less energy, produce less heat and generate less signal noise compared to electronic devices.

In spite of the numerous advantages of photons, all optical circuits have yet to be commercially available on a large scale. Some hybrid opto-electronic circuits have produced significant improvement over the performance of electronic circuits, but the difficulties in designing a multipurpose optical component analogous to the electronic transistor has severely hindered the development of all optical systems.

It is known that as the periodicity of a medium becomes comparable with the wavelength of electromagnetic waves traveling therethrough, the medium begins to significantly inhibit the wave's propagation. A photonic band gap (PBG) structure is one type of optical structure that is currently being investigated for certain electromagnetic (EM) wave applications. PBG are formed from photonic crystals, which are composite periodic structures made up of two different dielectric materials. Both of the dielectric materials should be nearly transparent to electromagnetic radiation in the frequency range of interest. However, the composite periodic structure may not be transparent to the frequency range of interest, due to electromagnetic scattering at the interfaces between the two dielectric components. Intervals of prohibited frequencies are called photonic band gaps.

Relying on the subwavelength wave inhibition effect, PBG structures are two or three-dimensional periodic array structures in which the propagation of EM waves may be described by band structure types of dispersion relationships resulting from scattering at the interfaces between the two dielectric components. Waveguide dispersion is the term used to describe the process by which an electromagnetic signal is distorted by virtue of the dependence of its phase and group velocities on the geometric properties of the waveguide. These photonic band gap structures provide electromagnetic analogs to electron-wave behavior in crystals, with electron-wave concepts such as reciprocal space, Brillouin zones, dispersion relations, Bloch wave functions, Van Hove singularities and tunneling having electromagnetic counterparts in a PBG. This has enabled the development of many new and improved types of photonic band gap devices, including devices in which optical modes, spontaneous emission, and zero-point fluctuations are substantially reduced.

PBG structures can also be formed with added local interruptions in an otherwise periodic photonic crystal, thereby generating defect or cavity modes with discrete allowed frequencies within an otherwise forbidden photonic band gap range of frequencies. Generation of an allowed defect state in an otherwise forbidden band gap enables applications such as high-Q resonators or filters.

In the absence of external currents and sources, Maxwell's equations for a photon in a dielectric waveguide may be represented in the following form:

$$\left\{\nabla \times \frac{1}{\varepsilon(r)}\nabla \times\right\}H(r) = \frac{\omega^2}{c^2}H(r)$$

where $H(r)$ is the magnetic field of the photon, $\omega$ is its frequency, c is the speed of light and $\in(r)$ is the macroscopic dielectric function of the waveguide. The solutions $H(r)$ for and $\omega$ are determined completely by the magnitude and symmetry properties of $\in(r)$. If $\in(r)$ is perfectly periodic, as in a photonic crystal comprising a dielectric waveguide having a periodic array of embedded features, such as a series of holes etched into the waveguide, the solutions to Maxwell's equation are quantized, characterized by a wavevector k and a band index n. Thus, the periodicity of the waveguide dielectric constant removes degeneracies that would otherwise allow free photon states at the Bragg plane, forming a photonic band gap. The region of all allowed wavevectors is referred to as a Brillouin zone and the collection of all solutions to the above equation is termed a band structure. Thus, in a perfectly periodic photonic crystal, allowed photonic states are quantized, with band gaps having no allowed states between discrete allowed states.

When a periodic array of features, such as holes, is introduced into a waveguide material to form a perfectly periodic photonic crystal, the wavevector k becomes quantized and limited to $\pi/a$, where a is the spatial period of the holes. In addition to putting a limit on wavevector values, the introduction of an array of holes in a waveguide has the effect of folding the dispersion relations $(\omega_n(k))$ of the strip waveguide and splitting the lowest-order mode to form two allowable guided modes. The splitting at the Brillouin zone edge is referred to as a band gap. The size of the band gap is determined by the relative dielectric constants of the waveguide material and the material filling the periodic structures, such as air in the case of holes. The larger the difference in relative dielectric constants, the wider the gap.

If a defect is included into an otherwise periodic PBG structure, an allowed photonic state can be created within the band gap. This state is analogous to a defect or impurity state in a semiconductor which introduces an energy level within the semiconductor's band gap. A defect in the otherwise periodic PBG structure is formed by incorporating a break in the periodicity of the PBG structure. PBG defects can take the form of a spacing variation using constant features, use features having a different size or shape, or use a different material. Introduction of a PBG defect may result in the creation of a resonant wavelength within the band gap.

The resonant wavelength of a PBG structure may be shifted by changing the defect. For example, a PBG structure using a defect in feature spacing can shift the resonant wavelength by altering the length of the defect in feature spacing. Increasing the defect spacing length increases the resonance wavelength to a longer value and also reduces the cavity's Q. The Q of an optical resonant cavity is its figure of merit, defined as $2\pi \times$ (average energy stored in the resonator)/(energy dissipated per cycle). The higher the reflectivity of the surfaces of an optical resonator, the higher the Q of the resonator and the less energy loss from the desired mode. An increase in defect length results in a corresponding increase in the effective refractive index felt by the resonant mode due to a reduced density of lower refractive index holes in the higher refractive index waveguide material. The increase in the effective refractive index of the waveguide material results in the reduction of the frequency of the resonant mode. This reduction enhances the coupling of the resonant mode to the waveguide mode. This increases the cycle average radiation out of the cavity resulting in a lower Q. A reduction in defect spacing length is expected to produce the inverse result.

Alternatively, the feature spacing, such as hole spacing, may be held constant, but a column of holes having a different size compared to the other PBG holes may be used to introduce an allowed photon state within the PBG band gap. For example, a column of holes may be placed in the PBG hole array having a radius greater or less than the nominal hole radius. As a further alternative, a row of PBG holes filled with a material having a refractive index higher or lower than the material filling the other PBG holes may be used to create an allowed photon state within the PBG band gap. Any of the above techniques may be combined.

Referring to FIG. 1(a), an example PBG structure 100 having a spacing defect is shown. Eight substantially cylindrical holes 101–108 are embedded in silicon waveguide 109. Waveguide 109 has a width 113 of $0.47\mu$ and thickness 114 of $0.2\mu$, which can be supported by silicon dioxide cladding layer 110. Holes 101–108 shown are cylindrical having a radius (r) of $0.1\mu$. The center to center spacing 111 (denoted as "a") between holes 101 and 102 is $0.42\mu$ and equivalent to the distance between holes 102 and 103, 103 and 104, 105 and 106, 106 and 107 and 107 and 108. However, the spacing between holes 104 and 105, 112 (denoted as $a_d$), is not equal to $0.42\mu$. Rather, this distance 112 is $0.63\mu$, 50% more than the nominal hole spacing (a).

FIG. 1(b) illustrates the spectral response of the PBG structure 100 etched in a silicon waveguide, as shown in FIG. 1(a). The large contrast of dielectric constants between the silicon waveguide ($\in_{Si}=12.1$) and PBG features filled with air ($\in_{air}=1$) creates a correspondingly wide band gap from between approximately 1300 nm to 1700 nm, or nearly 400 nm as shown in FIG. 1(b). A band gap functions as a stop band. The narrow resonance transmission peak centered at approximately 1540 nm results from placing a spacing defect into the PBG hole array which is otherwise comprised of equally spaced holes. The PBG structure shown in FIG. 1(a) has a calculated cavity quality factor Q of approximately 280 at the resonant wavelength.

Sub-wavelength structures (SWS) are a second type of optical structure. Grating structures are generally known in the art to provide a method of dispersing incident electromagnetic wave energy. In particular, gratings comprising periodic elements have been used to diffract light incident on a grating created by periodic slits cut into a given material. When light is incident on the surface of a single diffraction grating, the light may be reflected (or backward diffracted) and/or transmitted (or forward diffracted) at angles that depend upon the periodicity of the grating relative to the wavelength of the incident light and the light's angle of incidence. By the process of diffraction, light can be separated into its component wavelengths thereby forming a spectrum that can be observed, photographed, or scanned photoelectrically or thermoelectrically. Diffraction gratings can be used to influence the amplitude, phase, direction, polarization, spectral composition, and energy distribution of a beam of light. Gratings are therefore used in common instruments such as spectroscopes, spectrometers, and spectrographs.

Optical wavelength may be defined as the wavelength of an EM wave in a given material and is equal to the wavelength of the wave in a vacuum divided by the material's refractive index. As the period of the grating approaches the optical wavelength of the incident radiation, the diffracted orders begin propagating at increasingly larger angles relative the surface normal of the grating. Eventually, as the grating period is reduced and approaches the optical wavelength of the incident radiation, the angle of diffraction approaches 90 degrees, resulting in propagation of the radiation confined to the plane of the grating. This subwavelength condition effectively couples the fields of the incident radiation within the grating structure, a direction transverse to the surface normal of the grating.

An example of the formation and use of a subwavelength grating structure is described in U.S. Pat. No. 6,035,089, by Grann, et. al ("Grann"), which is assigned to Lockheed Energy Research Corporation, predecessor to the assignee of the current application. The entire contents of U.S. Pat. No. 6,035,089 are hereby incorporated by reference. Grann describes a single subwavelength grating structure (SWS) that uses periodically spaced high refractive index "posts" embedded in a lower refractive index dielectric waveguide material to form an extremely narrowband resonant reflector.

A subwavelength grating structure which functions as a zeroth order diffraction grating can be represented by an effectively uniform homogeneous material having an effective refractive index (neff). Under particular incident wave configurations, such as a substantially normal incident beam, and certain structural constraints, such as the refractive index of the medium surrounding the grating<refractive index of the waveguide<refractive index of the posts, a subwavelength structure may exhibit a resonance anomaly which results in a strong reflected beam over an extremely narrow bandwidth. If the incident radiation is not within the SWS resonant bandwidth, most of the energy of the incident beam will propagate through the grating in the form of a transmitted beam.

This resonance phenomenon occurs when electromagnetic radiation is trapped within the grating material due to total internal reflection. If this trapped radiation is coupled into the resonant mode of the SWS grating, the field will resonate and redirect substantially all of the electromagnetic energy backwards. This resonance effect results in a nearly total reflection of the incident field from the surface, which may be designed to be extremely sensitive to wavelength.

Grann's embedded grating structure results in minimal sideband reflections. Since Grann's resonant structure is buried within a waveguide, both the input and output regions of the grating share the same refractive index, resulting in minimal or no Fresnel reflection losses. Thus, reflection losses are minimized permitting operation as an extremely reflective resonant grating.

Reflective gratings may be combined to perform functions that a single reflective grating is incapable of realizing. For example, a Fabry-Perot interferometer may be constructed by combining two flat highly reflective plates. Fabry-Perot plates are generally set parallel to one another and separated by an optical path length equal to an integral number of half wavelengths of a desired wavelength so that light of a desired wavelength bounces back and forth between the plates multiple times. Optical path length is the physical separation distance between the mirrors multiplied by the refractive index of the waveguide. For a given plate spacing the requirement for constructive interference being an optical path length equal to an integral number of half wavelengths of the incident radiation of a given wavelength can be fulfilled only at particular incident angles, relative to the surface normal of the plates. Therefore, Fabry-Perot interferometers can be used as spectrometers with high resolution as well as optical resonators. Used as a laser resonator, the Fabry-Perot reinforces only light of specific wavelengths traveling perpendicular to the mirror surfaces, and its successive reflections and amplifications form an oscillating mode, creating an optical resonator.

SUMMARY OF THE INVENTION

The invention involves a transverse-longitudinal integrated optical resonator (TLIR) which comprises a waveguide, a first and a second subwavelength resonant grating in the waveguide and a photonic band gap resonant structure (PBG) having a plurality of features in the waveguide. The PBG is positioned between the first and second subwavelength resonant gratings. The first and second subwavelength resonant gratings and the PBG features may be embedded in the waveguide. The waveguide may be selected from the group of materials consisting of Si, Ge, ZnSe, $BaF_2$, CdTe, $LiNbO_3$ and SBN. The TLIR may further comprise at least one cladding layer positioned adjacent to the waveguide. Cladding layers have a lower index of refraction than the waveguide and may be selected from the group consisting of glasses and $BaF_2$.

The waveguide may be formed from an electro-optic material and the cladding layers may comprise at least one lower buffer layer positioned under the waveguide and at least one upper buffer layer positioned over the waveguide. The TLIR may further comprise a pair of electrically conductive discharge electrodes, wherein the waveguide is positioned between the electrically conductive discharge electrodes, the electrically conductive discharge electrodes being separated from the waveguide by the buffer layers. The TLIR may further comprising a bulk substrate material and a RF oscillator, wherein the RF oscillator is formed on the bulk substrate material and is electrically connected to the electrically conductive discharge electrodes.

The PBG can comprise at least one row of PBG features having at least one defect therein. Defects may be selected from the group consisting of a spacing defect, a size defect and a refractive index defect. PBG features include holes which may be filled with a gas, such as air. PBG features may be arranged in linear arrays.

Each subwavelength resonant grating structure can comprise a substantially periodic array of SWS features. SWS features from the first and second resonant grating may be arranged in substantially linear arrays or arranged along arcs having a radius of curvature.

PBG features may also be arranged along arcs having a radius of curvature. SWS features can be formed from materials having a refractive index higher than that of the waveguide material. SWS features may be formed materials such as Ge, $BaF_2$, $LiNbO_3$, SBN and Si.

The resonator formed by the first and second resonant gratings may have a first transmission resonance and the PBG may have a second transmission resonance, wherein the transmission resonances are substantially equal. The TLIR may sustain substantially one or more propagating modes.

TLIR may further comprise a bulk substrate material having a plurality of die, the die each having at least one electronic device, wherein the TLIR is positioned on the die. TLIR can be communicably connected to one or more of electronic devices and may further include a structure for cooling.

A composite optical resonator can be formed comprising at least two transverse-longitudinal integrated optical resonators connected in series or in parallel. A gas detector can be formed from a plurality of TLIRs, comprising a plurality of transverse-longitudinal integrated optical resonators (TLIR) connected in parallel, wherein the plurality of TLIRs exhibit transmission resonances centered at more than one wavelength. The gas detector may further include a bulk substrate material having plurality of die, wherein the gas detector can be positioned on the die.

A method for tuning the transmission resonance of a TLIR comprises the steps of providing a first and second subwavelength resonant grating structure in a waveguide, providing a photonic band gap resonant structure (PBG) in the waveguide, wherein the PBG is positioned between the first and second subwavelength resonant grating structures and tuning at least one of the transmission resonances to result in the transmission resonances being substantially equal. Preferably, being subtantially equal is when a ratio of the nominal transmission resonance wavelength ($\lambda$) divided by the spread in resonant wavelengths ($\Delta\lambda$) is less than the square root of the product of the PBG Q and the first and second subwavelength grating structure Q. In this context, the nominal transmission resonance wavelength ($\lambda$) may be defined as the arithmetic mean of the PBG transmission resonant wavelength and the transmission resonant wavelength of the resonator formed by SWS gratings. Most preferably, the ratio of the nominal transmission resonance wavelength ($\lambda$) divided by the spread in transmission resonant wavelengths ($\Delta\lambda$) is less than ½ the square root of the product of the Qs of the individual resonators. Tuning can be accomplished through electo-optic, photo-refractive, thermal, magneto-optic or tilting, or a combination of these methods.

The TLIR can process electromagnetic signals. The TLIR can be used for optical computing, optical signal modulation and wavelength division de-multiplexing.

A method of forming a TLIR comprises the steps of providing a first and second subwavelength resonant grating structure in a waveguide, providing a photonic band gap resonant structure (PBG) having a plurality of features in the waveguide, wherein the PBG is positioned between the first and second subwavelength resonant grating structure. The TLIR may be formed in a waveguide positioned on a bulk substrate material, the bulk substrate material having a plurality of die, including the steps of selecting the die, providing a first and second subwavelength resonant grating structure in the waveguide, and providing a photonic band gap resonant structure (PBG) having a plurality of features in the waveguide, wherein the PBG is positioned between the first and second subwavelength resonant grating structure. The method of forming a TLIR may further comprise a step of planarizing the waveguide and may comprise the step of providing at least one cladding layer, the at least one cladding layer formed over the bulk substrate. The cladding layer may comprise at least one lower buffer layer under the waveguide and at least one upper buffer layer over the waveguide.

The method of forming a TLIR may further comprise the steps of forming a first electrically conductive film over the at least one lower buffer layer and forming a second electrically conductive film over the upper buffer layer. The electrically conductive films each form electrically conductive discharge electrodes. The waveguide is positioned between the electrically conductive discharge electrodes, the electrically conductive discharge electrodes being separated from the waveguide by the buffer layers. The method may also include the step of forming an RF oscillator on the bulk substrate material, the RF oscillator electrically connected to the electrically conductive discharge electrodes.

A broadband reflective mirror comprises a waveguide having a first refractive index, and a subwavelength grating having a plurality of SWS features positioned with a substantially equal spacing. The SWS features are formed from at least one material having a second refractive index greater than the first refractive index, wherein incident photons within the broadband reflective mirror's bandwidth are substantially reflected. The waveguide may be formed from at least one electro-optic material, such as CdTe, $LiNbO_3$ and SBN. The waveguide can be a substantially planar waveguide, and the broadband mirror may further comprise at least one cladding layer positioned adjacent to the planar waveguide.

A method for determining a post grating period to form a broadband reflective mirror having a given center resonant wavelength comprises selecting a waveguide material having a first refractive index, selecting a post material having a second refractive index, the second refractive index greater than the first refractive index, and calculating a post grating period from factors including the center resonant wavelength, the first refractive index and the second refractive index.

A method for forming a broadband reflective mirror comprises the steps of selecting a waveguide having a first refractive index, and providing a subwavelength grating in the waveguide. The subwavelength grating has a plurality of SWS features positioned with a substantially equal spacing, the SWS features formed from at least one material having a second refractive index greater than the first refractive index. The subwavelength grating may be embedded in the waveguide. The broadband mirror can be used to process electromagnetic signals, including applications such as LIDAR and notch filtering.

A narrowband resonant transmitter comprises a waveguide having a first refractive index, and a first and second subwavelength resonant grating structure in the waveguide, the resonant gratings separated by a spacing distance, wherein incident photons over a narrow range of wavelengths are transmitted by the resonant transmitter. The narrow range of wavelengths are approximately determined by the spacing distance between the resonant gratings and the first refractive index. The narrowband resonant transmitter may comprise a waveguide formed from at least one electro-optic material, such as CdTe, $LiNbO_3$ and SBN. The narrowband resonant transmitter may also include a substantially planar waveguide, and further comprise at least one cladding layer positioned adjacent to the planar waveguide.

The narrowband resonant transmitter may further comprise a pair of electrically conductive discharge electrodes, wherein the waveguide is positioned between the electrically conductive discharge electrodes, the electrically conductive discharge electrodes being separated from the waveguide by the buffer layers. The narrowband resonant transmitter may further comprise a bulk substrate material and an RF oscillator, wherein the RF oscillator is formed on the bulk substrate material and is electrically connected to the electrically conductive discharge electrodes.

A method for forming a narrowband resonant transmitter comprises the steps of selecting a waveguide having a first refractive index, and providing a first and second subwavelength resonant grating structure in the waveguide. The resonant gratings are separated by a spacing distance, wherein the transmission resonance is approximately determined by the spacing distance and the first refractive index. The waveguide can be electro-optic. The narrowband transmitter equipped with an electro-optic waveguide can process electromagnetic signals for applications including electro-optic modulation.

The method of forming a narrow band resonant transmitter may further comprise the step of providing at least one cladding layer, the at least one cladding layer formed over a bulk substrate material. The at least one cladding layer may comprise at least one lower buffer layer under the waveguide and at least one upper buffer layer over the waveguide. The method may further comprise the step of forming a first electrically conductive film over the at least one lower buffer layer and forming a second electrically conductive film over the at least one upper buffer layer, the electrically conductive films each forming conductive discharge electrodes. The waveguide can be positioned between the electrically conductive discharge electrodes, the electrically conductive discharge electrodes being separated from the waveguide by the buffer layers. The method of forming a narrow band resonant transmitter may further comprise the step of forming an RF oscillator on the bulk substrate material, the RF oscillator being electrically connected to the electrically conductive discharge electrodes.

The narrowband transmitter may further comprise a bulk substrate material having a plurality of die, each die having at least one electronic device, wherein the narrowband resonant transmitter is positioned on the die. The narrowband resonant transmitter can be communicably connected to the one or more electronic devices on the die. The narrowband transmitter can be used for processing an electromagnetic signal including electro-optic modulation.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE PREFERRED EMBODIMENTS

Figure 2A:
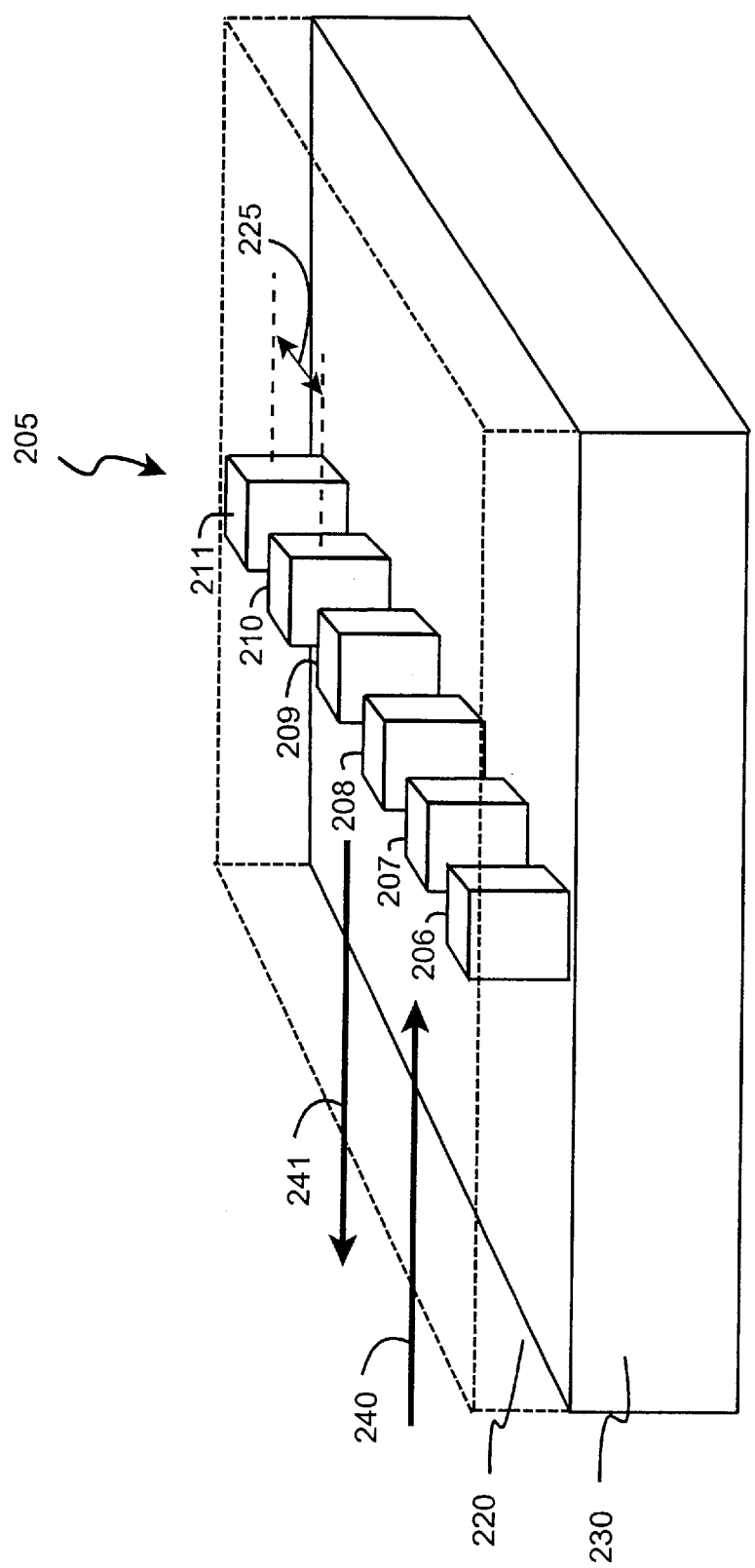
FIG. 2(a) illustrates a perspective view of an SWS grating having six posts.

Referring to FIG. 2(a), a broadband resonant reflecting SWS grating 205 is shown which is formed from six high refractive index posts 206–211 in a waveguide material 220. Posts 206–211 are periodically spaced having a given post-to-post spacing called a grating period (T) 225. The refractive index of material comprising posts 206–211 should be greater than that of the waveguide material 220. In some applications, it may be desirable to use an electro-optic material for posts 206–211 as well as the waveguide 220. Suitable post materials include Ge, BaF$_2$, LiNbO$_3$, SBN and Si. Cladding layer 230 having a refractive index lower than both the waveguide material and post material may be used to physically support SWS grating 205. Cladding layer 230 may comprise several individual layers, each having somewhat different physical properties.

Six to ten (or possibly more) posts 206–211 are believed to be a minimum number for SWS grating 205 to function as a resonant reflector and would correspond to cavity width of three to five resonant wavelengths, since the grating period 225 is nominally one half of a resonant wavelength. Feature shapes also influence SWS 205 function. Shapes such as square, cylindrical and rectangular have demonstrated successful results. Other shapes are also possible. Grating period 225 should preferably be less than the incident wavelength divided by the waveguide index of refraction (i.e., $\lambda_0/n_{wg}$). The specific grating period depends on the post index of refraction. The larger the post refractive index vs. waveguide refractive index, the smaller the ratio of wavelength to grating period 225.

Posts 206–211 may be arranged in a line or other arrangements which allow an approximately constant post-to-post spacing. For example, appropriately spaced posts may be placed along an arc having a given radius of curvature.

Again referring to FIG. 2(a), an incident photon beam 240 may be applied to SWS grating 205. A portion of the incident beam 240 is reflected as photon beam 241. If a large percentage of incident beam 240 is reflected, SWS grating 205 is said to act as a mirror. If SWS grating 205 functions as a mirror over a wide range of wavelengths, SWS grating 205 may be said to be a broadband mirror. The reflective bandwidth of SWS grating 205 may be defined to be a range of wavelength values within the SWS grating's 205 response which are within 3 dB of the SWS mirror's 205 peak reflective response. For example, if SWS grating 205 is fully reflective at a given center wavelength and a line is drawn at 70.71% (3 dB) below the peak reflectivity, a wavelength above and below the center wavelength will be cut. The difference between the wavelengths cut by the 3 dB line may be defined to be equal to the SWS grating's 205 bandwidth. A mirror may be defined to be a broadband mirror if its bandwidth is at least approximately 5% of the SWS grating's center wavelength. Preferably, the bandwidth of the broadband mirror is at least 10% of the SWS grating's center wavelength. For a center wavelength of 1.35μ, a bandwidth of 10% of the SWS grating's center wavelength amounts to a bandwidth of 1350 Å.

Figure 2B:
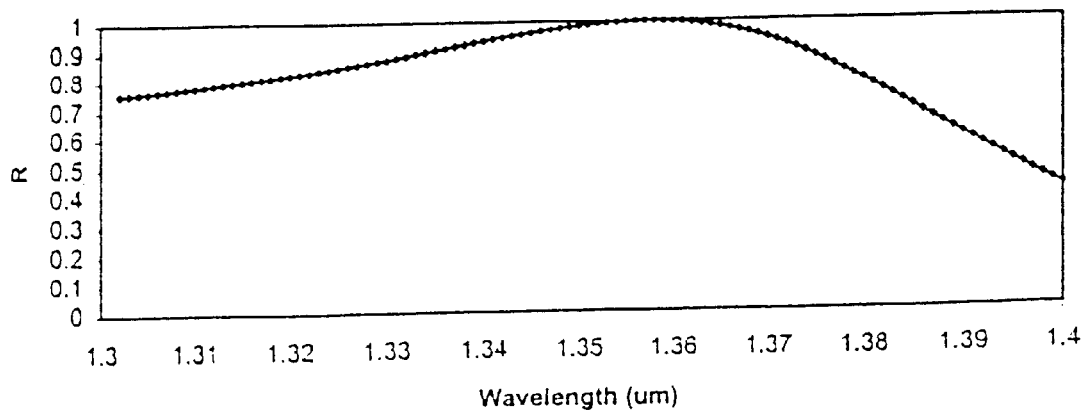
FIG. 2(b) illustrates the calculated spectral response of the SWS grating of FIG. 2(a) using a $LiNbO_3$ waveguide and square silicon posts.

FIG. 2(b) illustrates the calculated spectral response of a broadband mirror over a wavelength range of interest for the SWS grating 205 shown in FIG. 2(a) to an incident photon beam 240, where SWS grating 205 is formed in a LiNbO$_3$ (n=2.2) waveguide with square silicon posts (n=3.5) 0.285μ by 0.285μ having a grating period (T) 225 of 0.57μ. The spectral response shown in FIG. 2(b) may be characterized as that of a broadband mirror since its bandwidth extends from approximately 1.3μ to approximately 1.38μ, or approximately 6% of the center wavelength of 1.35μ. An SWS grating 205 with the above dimensions occupies an area of only approximately 1 square micron.

Figure 2C:
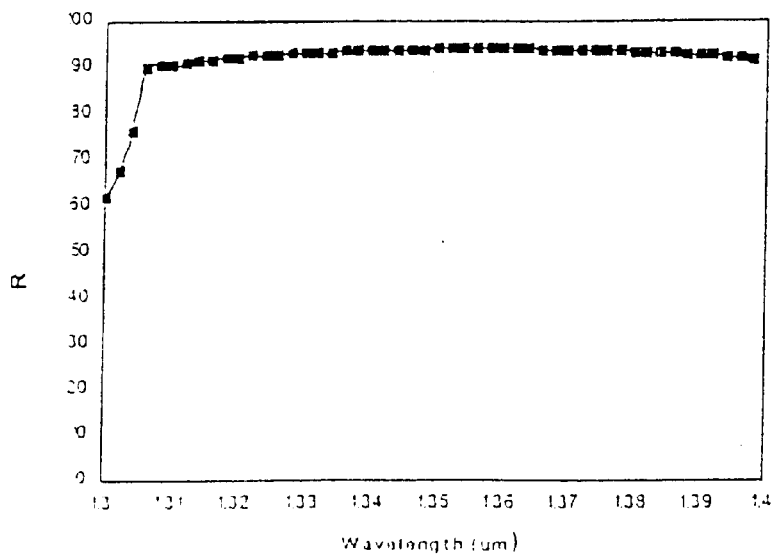
FIG. 2(c) Illustrates the calculated spectral response of the SWS grating of FIG. 3(a) using a $BaF_2$ waveguide and square silicon posts.

FIG. 2(c) illustrates the calculated spectral response of a broadband SWS mirror 205 as in FIG. 2(b), except a BaF$_2$ waveguide (n=1.45) was used. A bandwidth from approximately 1.31μ to over 1.40μ is shown in FIG. 2(c). Both FIGS. 2(b) and 2(c) demonstrate a broadband reflectance over a wavelength range centered around 1.35μ. This wavelength range is within the wavelength range commonly used in the telecommunications industry.

Although FIGS. 2(b) and 2(c) illustrate an SWS grating 205 demonstrating a broadband resonant reflectance, SWS grating 205 may exhibit no resonances (highly transmissive), an extremely narrow resonance, broadband resonance, or a resonance somewhere between narrow and broad. For example, Grann's grating exhibits a narrowband resonance, having a bandwidth of only few angstroms. The transmission characteristics of SWS grating 205 is determined by factors including the grating period 225, the refractive index difference between the waveguide 220 and post 206–211 materials and the post shape. Determination of appropriate grating parameters for SWS grating 205 to act as a broadband resonant reflector requires solution of Maxwell's equation and repeated iterations through adjustments of the grating period 225, the refractive index difference between waveguide 220 material and post 206–211 material as well as the post shape.

SWS grating 205 may be designed to function as a broadband reflector through iterative solutions by varying SWS parameters. Software simulations are preferably used to solve Maxwell's equations applied to photons interacting with periodic embedded SWS structures, such as SWS grating 205. This problem is usually solved using "rigorous coupled wave equation" simulations. For example, GSOLVER© grating simulation software produced by Grating Software Development Company, located in Allen, Tex., may be used to simulate photon interactions with SWS grating structures, such as SWS grating 205.

The grating variables involved in setting the spectral response of SWS grating 205 include the refractive index of the post 206–211 material, the refractive index of the waveguide 220 material, the grating period 225 and the fill factor, also referred to as the "duty cycle." The fill factor or duty cycle is defined as the fraction of area within the grating region containing posts. Post 206–211, waveguide 220 and cladding material 230 are chosen such that the refractive index of the post 206–211 material exceeds the refractive index of the waveguide 220 material, and the waveguide 220 material exceeds the refractive index of the cladding material 230.

A desired center resonant wavelength Ao is then selected. The initial fill factor may be set at 50%, for example, when the width of individual post is equal to half of the grating period 225. The required grating period 225 to achieve a desired center resonant wavelength $\lambda_0$ may be estimated. The following equation below provides an estimate of the grating period (T) 225 required to achieve a resonant reflectance at a desired center resonant wavelength $\lambda_0$, given the waveguide 220 refractive index (ng) and post 206–211 refractive index ($n_{sws}$).

$$T = 3\lambda_0/(n_g * n_{sws})$$

Using a rigorous coupled wave equation software package, such as GSOLVER©, SWS grating structures, such as 205, or optical resonators formed by combining two grating structures such as 205, may be simulated over a range of wavelengths and the resulting center resonance wavelength $\lambda_0$ determined. Once a grating period 225 is found that results in the desired center resonance reflectance wavelength $\lambda_0$, the simulation may proceed to increase the grating's bandwidth.

The reflective resonance bandwidth of SWS grating 205 may be changed by adjusting the post fill factor and the shape of the posts, or both the fill factor and post shape. As a preferred method, the post fill factor is first either increased or decreased, and the results simulated. This iterative method may be continued until the bandwidth is maximized, or at least acceptably wide for a given application. If the bandwidth is not broad enough, the bandwidth may be further changed by changing post shape. For example, in the case of square posts, rectangular posts may be substituted and results re-simulated.

The particular manufacturing process used for fabricating the SWS grating 205 should preferably be inexpensive and reproducible. Conveniently, the SWS grating 205 of the present invention can be fabricated using any standard integrated optics or electronic integrated circuit manufacturing method. Such methods use standard oxidation, deposition, lithography and etching steps. For example, waveguide 220 may be deposited, patterned, and etched simultaneously with the formation of silicon gate electrodes during a CMOS IC process.

In applications where post geometries are deep submicron, posts 206–211 may be formed by E-beam lithography writing the desired pattern into a photoresist layer deposited on the top of the waveguide 220. Once the photoresist is developed, reactive ion etching can be used to create desired structures within the waveguiding region. The next step involves filling in the holes that have been etched away in the waveguiding region with the appropriate post material to create the SWS 205 grating structure. A deposition process such as LPCVD or PECVD may be used for this purpose. Finally, a polishing step, such as chemical mechanical polishing (CMP) to improve surface flatness and to eliminate any surface irregularities caused during the process may be added to reduce the lossiness of the cavity. Thus, the very small size, simple structure and standard processing steps involved in forming SWS gratings 205 permit fabrication on a bulk substrate material die and integration with other optical or electronic components on the same die. The particular manufacturing process used for fabricating the grating is not essential to the present invention.

Broadband SWS gratings 205 may be used in electromagnetic systems which transmit or receive over a range of wavelengths. For example, light detection and ranging systems (LIDAR) transmit over a fairly broad range of wavelengths. LIDAR systems use a light beam in place of conventional microwave beams for atmospheric monitoring, tracking and detection functions. Any particular signal might have a very narrow wavelength. In order to detect these signals and remove interference from radiation outside the range of wavelengths of interest, a broadband SWS grating 205 could be used as a band filter. Frequencies outside the SWS grating's 205 bandwidth would be filtered (transmitted) while all narrow signals within the SWS structure's bandwidth would be passed (reflected). SWS grating 205 may also be used as a notch filter with a Q dependant on the particular design. Notched filters have a variety of applications. For example, notched filters may be used to isolate one band of frequencies from another band of frequencies.

Two broadband reflecting SWS gratings 301 and 302 (collectively hereinafter generally SWS gratings 301/302), may be combined in a waveguide 320 as shown in FIG. 3(*a*) to form an optical resonator by spacing a first and second SWS gratings 301 and 302 an optical distance 315 equal to approximately an integral number of half wavelengths of the desired resonant wavelength. Optical path length (OPL) or optical distance 315 equals the physical distance between the mirrors multiplied by the refractive index of the waveguide material. SWS gratings 301 and 302 may each be fabricated as described for SWS grating 205. The spectral response of the SWS gratings 301/302 approximates the transmission characteristics of a conventional two mirror Fabry-Perot interferometer.

SWS gratings 301 and 302 within waveguide 320 may be supported by cladding layer 330 as shown in FIG. 3(*a*). Although SWS gratings 301/302 may operate individually as broadband reflectors, such as the calculated spectral responses shown in FIGS. 2(*b*) and 2(*c*), the combination of SWS gratings 301/302 in a common waveguide 320 can produce near 100% transmission over a very narrow range of wavelengths, while strongly reflecting other wavelengths.

Initially, electromagnetic radiation such as light 310 having a wavelength equal to a wavelength within the bandwidth of SWS grating 301 will be almost entirely reflected 311. The small amount of light 312 that enters the cavity formed between SWS grating 301/302 will be effectively trapped in the cavity, bouncing back and forth many times. At the atomic level, light trapped in the cavity induces electric dipoles on the mirror surface, just like the incident light beam. When the dipoles generated in SWS mirror 301 by the trapped light 312 is 180 degrees out of phase with the dipoles generated by the incident light 310, the resulting dipole amplitude on SWS mirror 301 is reduced. Reduced dipole amplitude allows SWS gratings 301 to become more transmissive, allowing more light 310 into the cavity and further reducing the resultant dipole amplitude and the SWS mirror 301 reflectivity. This process continues quickly until the cavity's optical amplitude and phase are such that the rate of dipoles generated in SWS mirror 301 by the incident light 310 is precisely balanced by the rate of cavity generated dipoles. When this balance occurs, incident light 310 at the resonant wavelength is easily transmitted through the SWS gratings 301 and 302 and the cavity region. The optical wavelength at which this transmission resonance occurs is largely dependent on the optical path length 315 between SWS mirrors 301 and 302.

FIG. 3(*b*) illustrates the calculated spectral response of the SWS gratings 301/302 in FIG. 3(*a*) having a grating separation of 0.435$\mu$ and grating period of 0.57$\mu$ formed from a LiNbO$_3$ waveguide having square silicon posts therein (0.285$\mu$ by 0.285$\mu$). The structure described in FIG. 3(*b*) occupies an area of approximately 3 square microns. A narrow transmission resonance having a 3 dB bandwidth of approximately 30 Å is shown having a center wavelength of approximately 1.35$\mu$. The cavity has a Q of nearly 500. FIG.

Figure 3A:
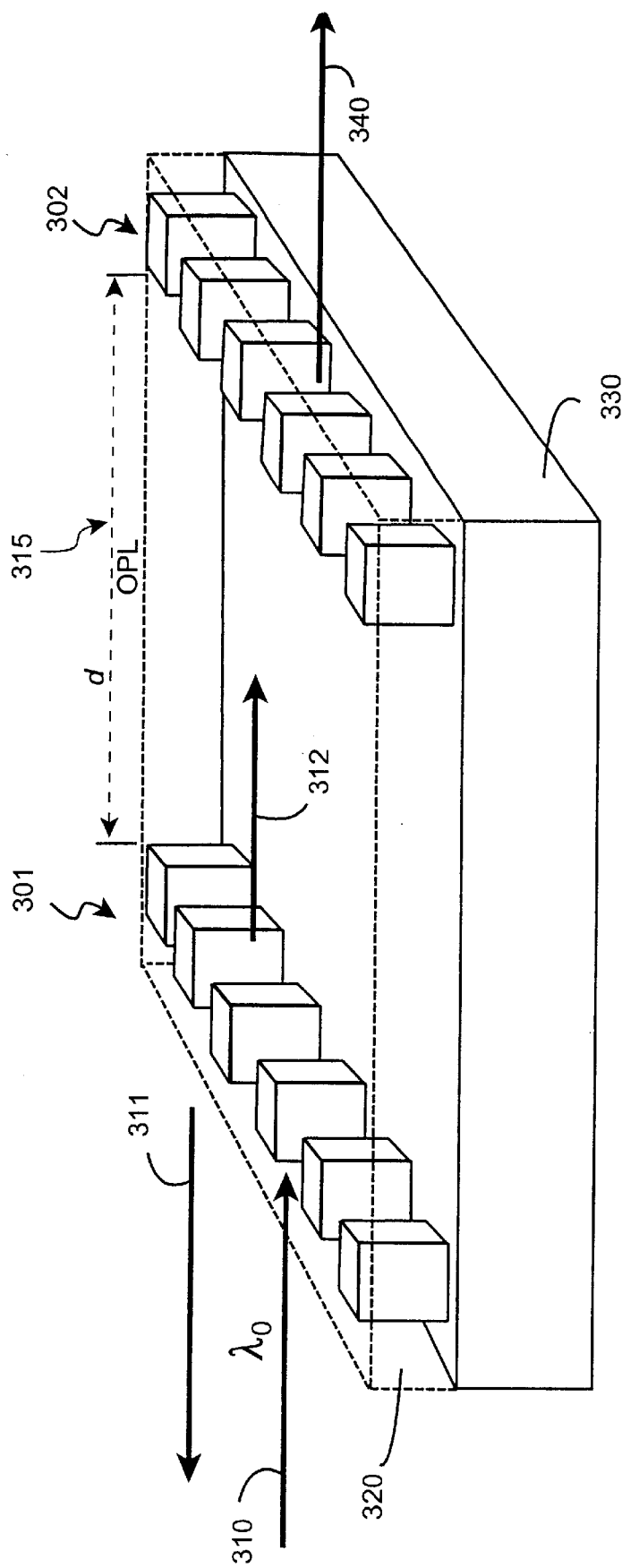
FIG. 3(a) illustrates a perspective view of two adjacent SWS grating structures.

3(c) illustrates the calculated spectral response of the first and second SWS mirror in FIG. 3(a) having a mirror separation of $1.38\mu$ and grating period of $0.57\mu$ formed from a $LiNbO_3$ waveguide with embedded square silicon posts ($0.285\mu$ by $0.285\mu$). The structure described in FIG. 3(c) occupies an area of approximately 10 square microns. A narrow transmission resonance having a 3 dB bandwidth of only a few angstroms is shown having a center wavelength of approximately $1.355\mu$. The cavity has a Q of nearly 10,000.

Figure 3B:
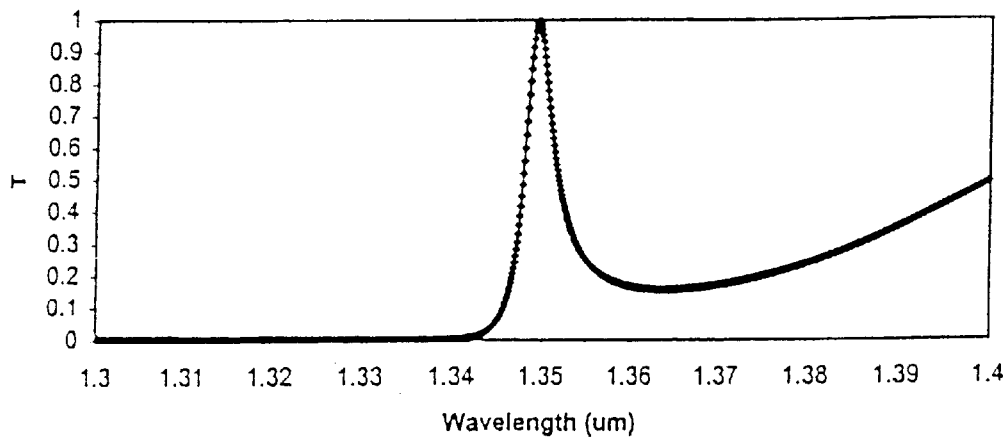
FIG. 3(b) illustrates the calculated spectral response of the SWS mirrors in FIG. 3(a) spaced $0.435\mu$ formed in a $LiNbO_3$ waveguide having embedded square silicon posts.
Figure 3C:
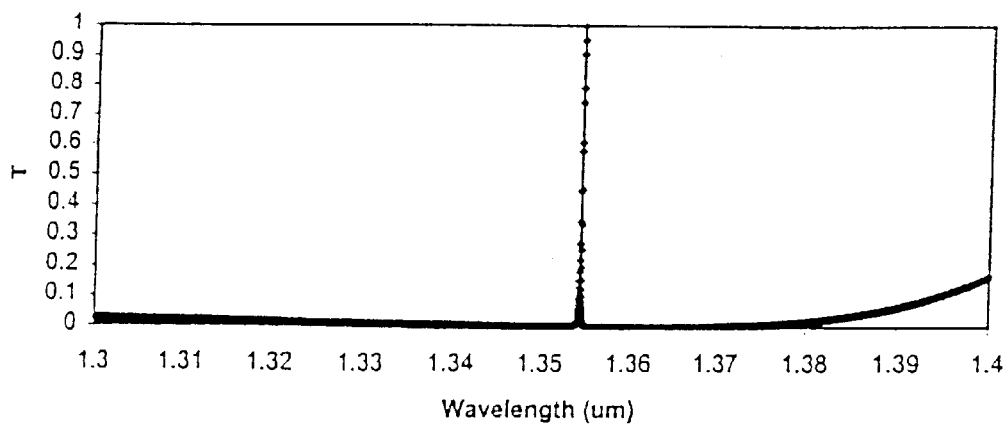
FIG. 3(c) illustrates the spectral response of the SWS mirrors in FIG. 3(a) spaced 1.38μ apart formed in a LiNbO$_3$ waveguide having embedded square silicon posts.

As shown by FIGS. 3(b) and 3(c), separating two broadband SWS mirrors 301 and 302 an optical distance 315 equal to an integral number of half wavelengths results in a device that transmits nearly 100% over a very narrow range of frequencies determined primarily by the optical path length 315 between the SWS mirrors 301 and 302. The minimum device size for the resonator depends on the wavelength range to be processed. Shorter wavelengths require smaller features which reduce the device size. For near IR wavelengths, the minimum device area is on the order of several square microns. Such a size is small enough to be integrated onto a typical bulk substrate material die and be interfaced with various electronic or optical devices housed on a common die.

If the resonant cavity is comprised of an electro-optic waveguide material, such as SBN, CdTe and $LiNbO_3$, and if the waveguide material separating the first and second gratings 301/302 is positioned between two electrodes, the cavity's optical path length can be varied by application of a voltage across the electrodes. Electro-optic materials are materials that have refractive indices that can be altered by application of an electric field. Since the cavity's optical path length (OPL) 315 is a function of the physical grating separation distance (d) multiplied by the waveguide's index of refraction (n), a change in the waveguide's index of refraction shifts the optical path length. A change in the cavity's optical path length shifts the center resonant wavelength an amount $\Delta\lambda$:

$$\Delta\lambda=(2d(\Delta n))/m, \text{ where m is possible cavity modes}=1,2,3 \ldots \text{ For a single mode cavity, } \Delta\lambda=2d(\Delta n).$$

Application of a voltage across an electro-optic cavity having a Q significantly greater than 1 causes an electro-optic amplification effect because of the electromagnetic wave reflections within the cavity. The Electro-optic effect amplification allows a beam of photons to be modulated with a correspondingly lower applied voltage due to a lengthened residence time in the resonant cavity. For example, an electro-optic cavity having a Q of 500 allows a voltage equal to $\frac{1}{500}$ of the voltage otherwise required to modulate an electro-optic cavity having a Q equal to 1. Thus, a low voltage optical modulator may be realized which allows higher switching speeds and compatibility with state of the art integrated circuits which use very low power supply voltages, such as 1 volt, or less.

The applied voltage can be a high speed alternating voltage signal to permit high speed modulation or switching. The ability to switch with low supply voltages due to the electro-optic amplification effect provides increased switching speeds. The resonator formed by SWS gratings 301/302 in an electro-optic waveguide 320 may also be used to implement logical functions. For example, an incident light 310 having a wavelength equal to the resonant wavelength may be applied to SWS gratings 301/302 positioned in an electro-optic waveguide. Prior to application of a voltage across the waveguide, incident light 310 is efficiently transmitted through SWS grating 301/302 and the cavity region between leaving the cavity as transmitted light 340. An appropriate light detector can be used to measure the intensity of transmitted light 340, an intensity above a certain level treated as a logical state, such as "1". Application of an appropriate voltage across the electro-optic waveguide 320, changes the waveguide's refractive index resulting in a new optical path length 315. Thus, incident light 310 will not be transmitted and the lack of sufficient intensity of transmitted light may be treated as a logical "0," for example. Consequently, SWS gratings 301/302 together with a source of refractive index modulation of the waveguide may be used to implement logical and memory devices. If the modulation technique permits relatively long term holding of programmed refractive index information, an alterable non-volatile memory device may be realized. In this application, a DC voltage may be applied to SWS 301/302 formed in an electro-optic waveguide material.

The manufacturing process used for fabricating the first and second SWS grating 301/302 may be the same as the standard optics or electronic integrated circuit methods described earlier. First and second SWS mirrors 301 and 302 may be simultaneously formed on semiconductor bulk substrate material die during standard IC processing. If electro-optic operation is desired, the process will include the formation of an electro-optic waveguide material, electrically conductive discharge electrodes and one or more buffering layers. Discharge electrodes are formed from electrically conductive materials and are positioned above and below the electro-optic waveguide material. Normally lossy discharge electrode materials will be preferably separated from the electro-optic waveguide by one or more low refractive index buffer layers, such as cladding layer 330, of sufficient thickness to "hide" the discharge electrodes from light traveling within the waveguide 320. As in the case of the formation of a single SWS grating 205, the particular manufacturing process used for fabricating the grating is not essential to the present invention.

This structure permits a new class of high speed micro electro-optic light modulators/filters, small enough to be integrated on a bulk substrate material die. Alternatively, arrays of electo optical modulators/filters may be arranged on a bulk substrate material die, each modulator/filter having differing resonant wavelengths, if desired.

Now referring to FIG. 4, a first and second subwavelength grating structure 407 and 408 (hereinafter collectively SWS gratings 407/408) are combined with a photonic band-gap (PBG) structure 402 positioned between gratings 407 and 408 to form a transverse-longitudinal integrated resonator (TLIR) 400. A TLIR 400 optical cavity may be fabricated having a high Q and exhibit a narrowband transmission resonance. An advantage of including PBG 402 within the TLIR 400 cavity is access to the TLIR cavity and concentration of the TLIR 400 cavity's optical energy in the PBG features comprising a plurality of features, such as holes 410–417, 420–427, 430–437, 440–447, 450–457, 460–467, 470–477, 480–487 and 490–497 (hereinafter collectively PBG features 410 . . . 497).

Figure 4:
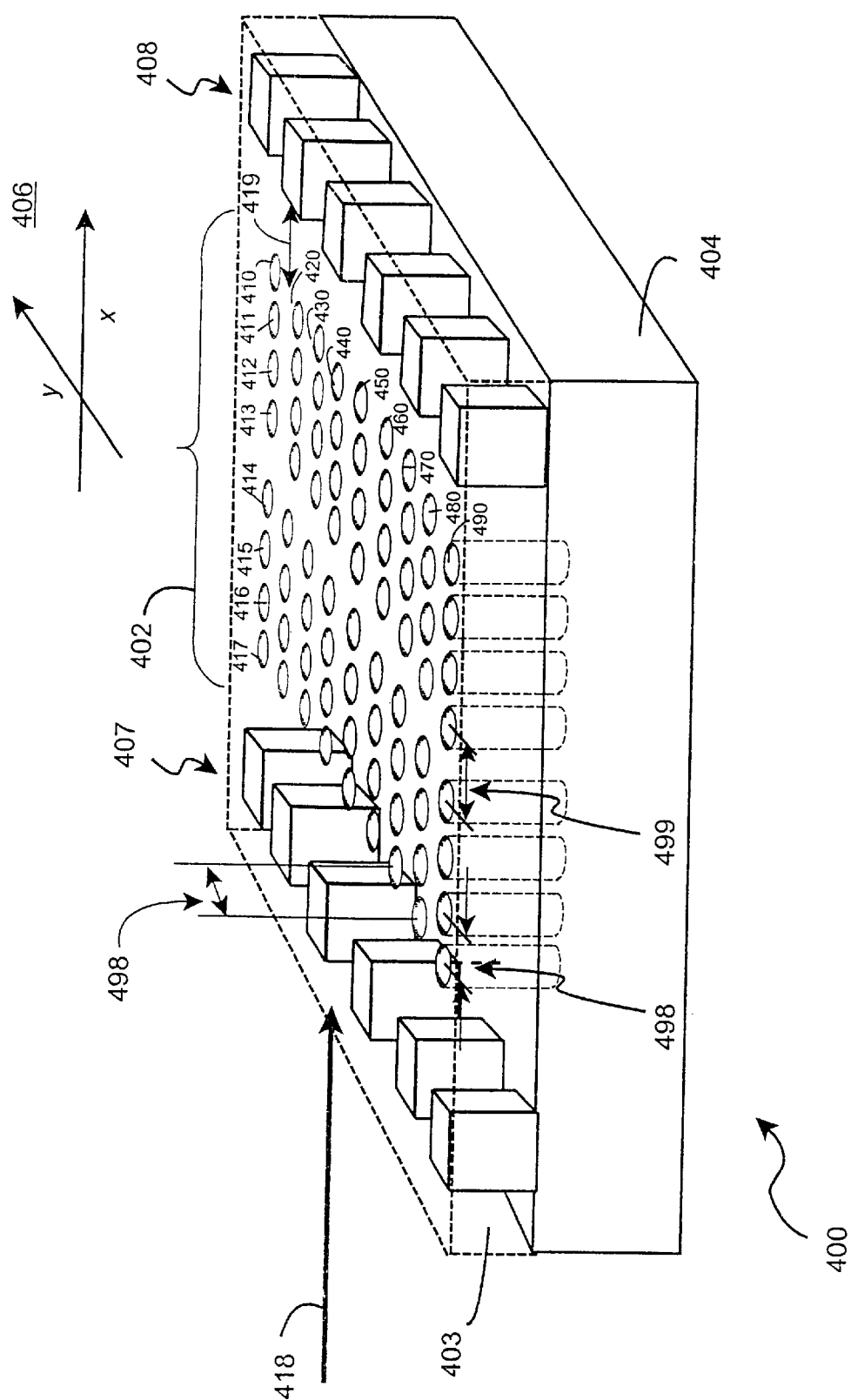
FIG. 4 illustrates a perspective view of a transverse longitudinal integrated resonator (TLIR), representing an embodiment of the present invention.

Although the PBG features shown in FIG. 4 are holes, PBG features may be filled with various materials, such as solids, liquids and gases. In making a TLIR 400, it is preferable that each SWS grating 407/408 exhibit a broadband resonance, equivalent to that of a broadband highly reflective mirror over the wavelength range of interest. Both SWS 407/408 and PBG 402 are provided in a common dielectric waveguide material. Waveguide materials should preferably be substantially planar to minimize lossiness and sustain one or more propagating modes at the resonant wavelength therein. Cladding layer 404 may be added adjacent to TLIR 400 to support TLIR 400 and help to keep light within the TLIR 400 cavity.

Filling PBG features with a fluid alone will not produce the desired TLIR 400 spectral response because an optical path length would not be produced. Placing SWS gratings 407/408 in a Fabry-Perot cavity with a single void in the middle of the cavity would not well work because light would not be "guided" within the cavity, because no distinct core and cladding region would exist. Accordingly, this type of unguided optical cavity region would be very lossy. Thus, in the preferred embodiment of the invention, combining a first and second broadband reflecting SWS gratings 407/408 with a PBG 402 having a plurality of PBG features 410 . . . 497 in a Fabry-Perot cavity provides the ability to dramatically reduce the size of a "cell" and provide performance associated with having the same effective cavity length as "1-pass" guided wave devices of correspondingly longer length.

Suitable waveguide materials are preferably materials having poor electrical conductivity and relatively high refractive indexes. In addition, the waveguide 403 material should have a uniform index of refraction and a very low absorption coefficient. Consequently, polycrystalline, amorphous as well as single crystal materials having the above characteristics generally make suitable waveguide 403 materials for most TLIR applications. However, for TLIR 400 applications requiring-electo-optic switching, such as electro-optic modulator or switch, a waveguide material capable of refractive index modulation in response to an applied electrical field is preferably used. Commonly used electro-optic waveguide materials. comprise appropriately oriented substantially single crystal materials. The refractive index of the waveguide 403 material should be less than the refractive index of the SWS posts 407/408, as described later, but greater than the refractive index of the adjacent cladding layer or layers.

In FIG. 4, cladding layer 404 combined with surrounding air 406 comprise the cladding for TLIR 400. Although air is assumed to surround TLIR 400 in FIG. 4, TLIR 400 operates under a wide variety of ambients. Generally suitable waveguide 403 materials include Ge, $BaF_2$, ZnSe, CdTe, $LiNbO_3$, SBN and Si. The thickness of the waveguide should preferably be 0.5 to 1 resonant wavelength, assuming single mode operation is desired.

Even in TLIR 400 applications where electro-optic modulation is normally not required, such as a typical laser, it may still be desirable to retain the ability to change the TLIR 400 cavity's optical path length. For the TLIR 400 cavity to properly operate as a narrowband transmitter, PBG 402 should be substantially transmissive at a wavelength preferably substantially equal to the resonant wavelength of the resonator formed by SWS gratings 407/408. If the respective transmissive wavelengths following fabrication do not coincide sufficiently for proper TLIR 400 operation, one or more post fabrication methods for tuning TLIR 400 may be used. For example, TLIR 400 may be tuned by modification of the optical path length of TLIR 400. Optical path length modification primarily shifts the resonant wavelength of the resonator formed by SWS gratings 407/408.

As used herein, tuning refers to the process of reducing the difference. between the PBG 402 resonant wavelength and the resonant wavelength of the resonator formed by SWS gratings 407/408. Tuning may be used to result in the respective resonant wavelengths being substantially equal. Preferably, the ratio of the nominal transmission resonance ($\lambda$) divided by the spread in resonant wavelengths ($\Delta\lambda$) should be less than the square root of the product of the Qs of the individual resonators. The nominal transmission resonance ($\lambda$) may be defined as the arithmetic mean of the PBG 540 resonant wavelength and the resonant wavelength of the resonator formed by SWS gratings 515/516. For example, if the PBG 540 has a Q of 1,000 and the resonator formed by the SWS gratings 515/516 has a Q of 10,000, and $\lambda=1\mu$, the calculated preferred maximum wavelength spread ($\Delta\lambda$) is found to be approximately 3.16 Å. Most preferably, the ratio of the nominal transmission resonance ($\lambda$) divided by the spread in resonant wavelengths ($\Delta\lambda$) should be less than ½ the square root of the product of the Qs of the individual resonators.

One group of tuning techniques involves adjusting the cavity's refractive index. For example, an electrical field may be used if the cavity material exhibits an electro-optic, Pockels or Kerr effect. Some materials exhibit a photo-refractive effect whereby shining a light onto a cavity filled with a photo-refractive material changes the material's refractive index. Other materials are thermal-cavity materials, which change refractive index due to thermal expansion. Some cavity materials are magneto-optic and will change refractive index based on applied magnetic field strength. Almost all materials show, at least to some degree, electro-optical, photo-refractive, magneto-optical, and thermal effects. Depending on the TLIR 400 cavity's Q and cavity material, any one or a combination of these tuning methods can be used.

A cavity's optical path length may also be changed without changing the cavity's refractive index. For example, the cavity may be theoretically tilted with respect to the incident optical wave. As the tilt angle measured from the normal increases, the effective cavity length increases. As the effective cavity length increases, the resonant wavelength of the resonator formed by SWS gratings 407/408 also increases. Laser trimming is also possible to tune TLIR 400, but is not preferred due to the area coverage required.

In the preferred embodiment of the invention, an electro-optic waveguide material together with a pair of appropriately distanced discharge electrodes may be used to permit fine tuning the resonant wavelength of the resonator formed by SWS gratings 407/408, as well as the electro-optic modulation of TLIR 400. Electro-optic tuning will generally be accomplished though application of an appropriate continuously applied DC holding voltage across waveguide 403. However, some adjustment techniques known in the art provide electro-optic adjustment without the need for a continuously applied holding voltage. If both continuously applied electro-optic tuning and electro-optic modulation are employed, an AC modulating signal may be superimposed on a DC holding voltage.

The transmission resonance of PBG 402 may also be adjusted. For instance, this resonance may be changed in some applications by changing the gas or liquid density within the PBG features 410 . . . 497. Alternatively, hole size may also be adjusted, possibly through laser trimming PBG features 410 . . . 497.

The waveguide 403 may be characterized as having an effective refractive index based on the refractive index of the waveguide material combined with the refractive index of the material filling the PBG features 410 . . . 497. Since the optical path length in the cavity is equal to the effective waveguide refractive index multiplied by the physical spacing distance between the SWS gratings 407/408, the optical path length may be modified by modifying the effective refractive index of the waveguide 403. Electro-optic materials are known to allow adjustment of their refractive index through application of an appropriate electrical field. Thus, through use of an appropriate electro-optic waveguide and application of an appropriate electrical field, the spectral response of the TLIR 400 cavity may be conveniently set or modulated.

TLIR 400 may be physically supported by one or more cladding layers 404. Suitable cladding layer 404 materials should have a lower index of refraction than either the SWS posts such as 405 or the waveguide 403 material so the cladding layer 404 directs substantially all impinging light from waveguide 403 back to waveguide 403. Cladding layer 404 material should also be compatible with processing required to form the TLIR 400. Examples of suitable cladding layer materials which may generally contact waveguide 403 directly include most glasses (such as $SiO_2$, n=1.45 to 1.5) and $BaF_2$ (n=1.39).

PBG 402 is formed in waveguide 403 from a plurality of periodic low refractive index features, such as PBG features 410 ... 497. The refractive index of the material filling PBG features 410 ... 497 should preferably be less than the refractive index of the waveguide material 403. A possible suitable low refractive index material is air, formed by creating holes in the dielectric waveguide material 403 and exposing the TLIR 400 to the atmosphere. Such features may be formed by a suitable lithographic and etch process. PBG features 410 ... 497 and nominal hole spacing 498 should be less than the desired resonant wavelength.

Practical PBG 402 structures generally contain multiple columns of equivalent PBG features, such as the column defined by holes 410, 420, 430, 440, 450, 460, 470, 480 and 490 to substantially fill the waveguide width created by SWS gratings 407 and 408.

PBG features may be arranged in nonlinear arrays provided constant feature spacing is maintained. For example, PBG features may be arranged along arcs having a given radius of curvature.

Substantially filling the entire TLIR cavity 400 width with periodically placed PBG features 410 ... 497 maintains the same effective refractive index along the entire waveguide 403 width. This minimizes undesirable effects such as Fresnel reflections.

Figure 1A:
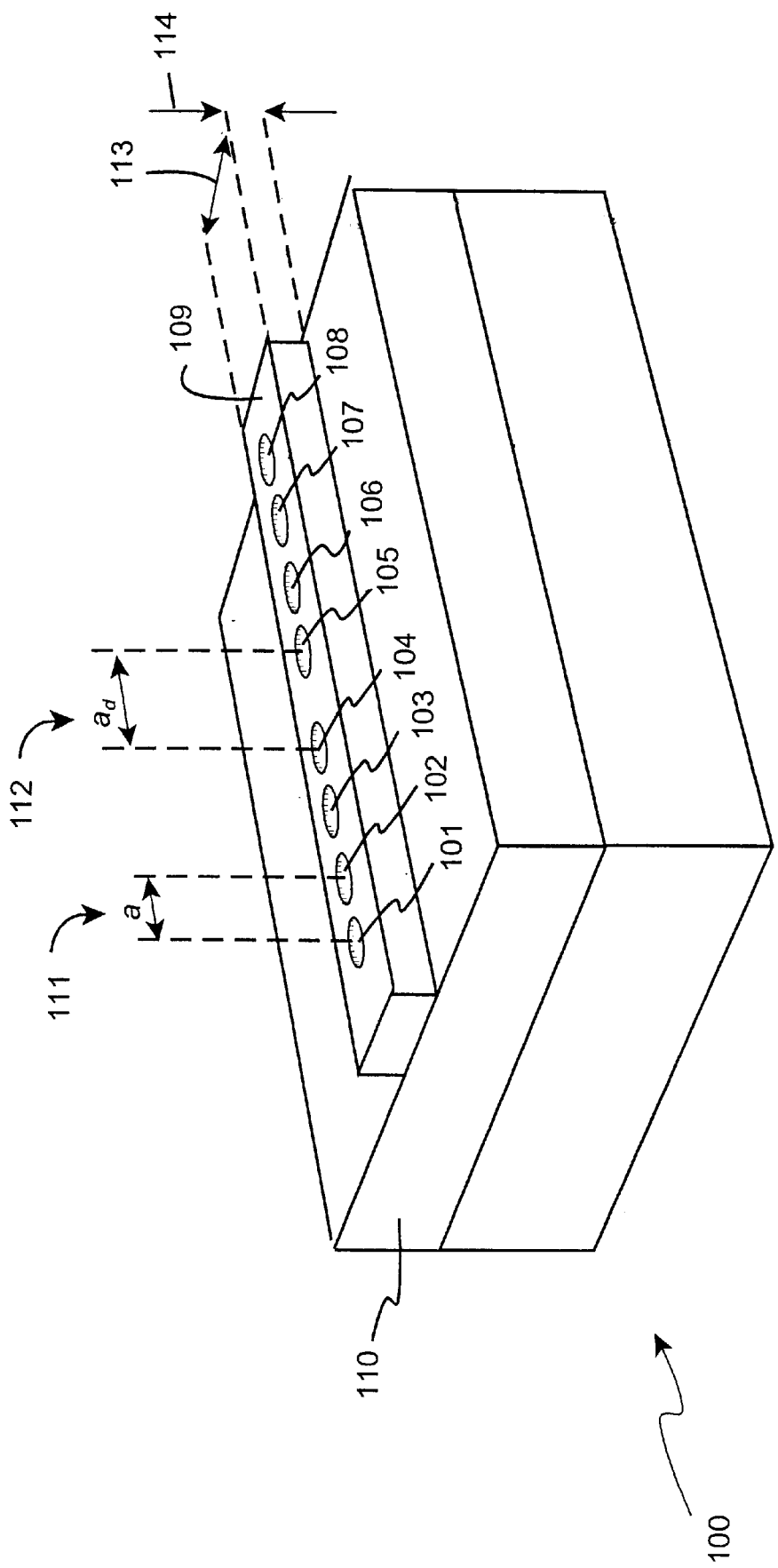
FIG. 1(a) illustrates a perspective view of a PBG structure with an introduced spacing defect.
Figure 1B:
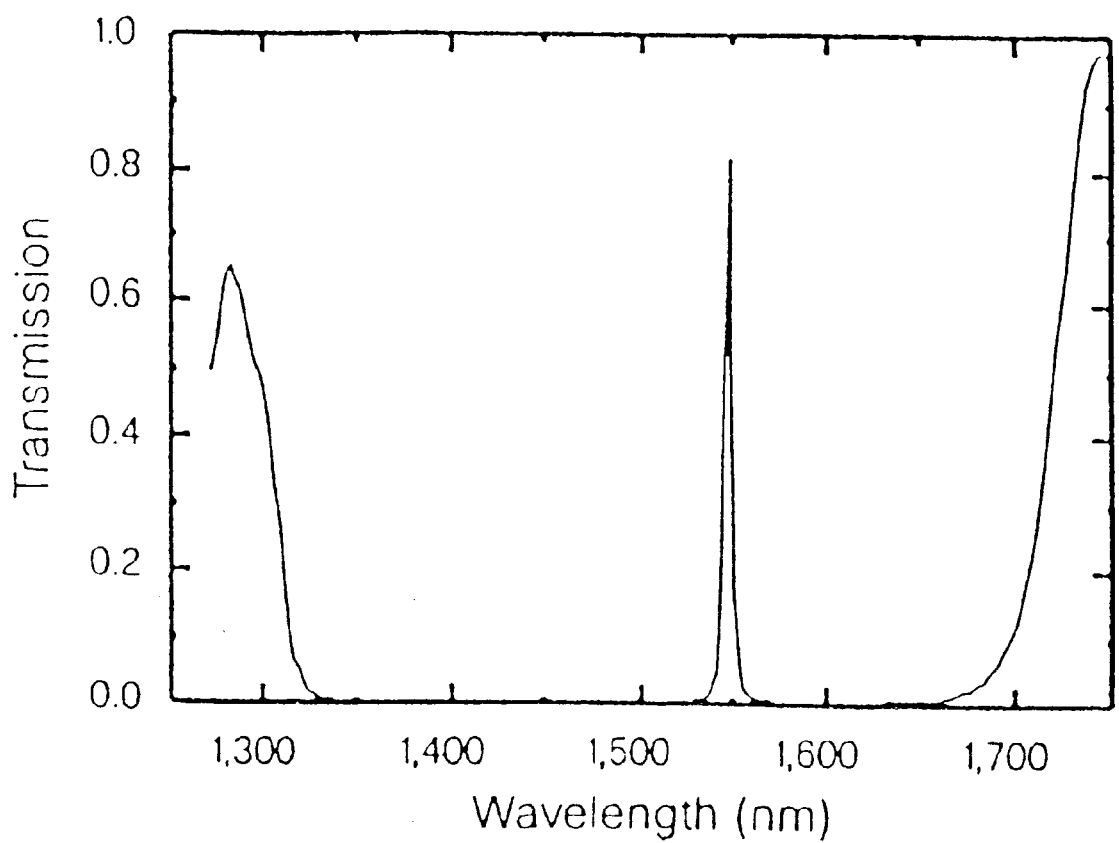
FIG. 1(b) illustrates the spectral response of the PBG in FIG. 1(a) over a band gap demonstrating a narrow resonant transmission state.

Six to ten PBG features 410 ... 497 per arc or row are believed to be a minimum number to achieve a spectral response comparable to that of FIG. 1(*b*) and would correspond to a cavity length of three to five resonant wavelengths, since the period between PBG features 498 is nominally equal to ½ of a resonant wavelength. Feature periodicity should preferably be less than the incident wavelength divided by the waveguide index of refraction (i.e., $\lambda_0/(n_{wg})$).

PBG feature shape may also be altered. Shapes such as cylindrical and rectangular PBG features 410 ... 497 have been modeled with successful results. Other shapes are also possible.

An allowed photonic state may be positioned within the PBG band gap by placing a defect into the PBG structure. A defect may be added to the PBG by the introduction of a defect in the spacing of an otherwise constant feature spacing (spacing defect). Alternatively, in the case of features comprising holes, a column of holes having a different size compared to the other PBG holes may be placed in the PBG hole array (size defect), such as a column of holes having a volume greater or less than the nominal hole volume. In the case of cylindrical holes, changing the hole volume would normally be accomplished by changing the hole radius relative to other PBG holes. As a further alternative, a row of PBG features filled with a material having a refractive index different (higher or lower) relative to the other PBG features (refractive index defect) may be used to create an allowed photon state within the PBG created band gap. The above techniques may also be combined. For example, a column of PBG features having a radius greater than the nominal radius (size defect) may be filled with a material having a refractive index greater than that of the other PBG features (refractive index defect).

For example, for a desired resonant wavelength of approximately 1.5$\mu$, PBG holes may be periodically spaced 0.42$\mu$, the defect length set to 0.62$\mu$, and hole radius of 0.1$\mu$. Introduction of a defect in the spacing of an otherwise periodic array of low refractive index features (spacing defect), such as holes 410 ... 497, creates an allowed photonic state within the PBG 402 and results in a longitudinal cavity resonance, providing nearly a 100% transmission at the resonant wavelength within the PBG 402 band gap.

For example, defect 499 having a length of 1.5 times the otherwise periodic hole spacing 498, or 0.63$\mu$, may be used to create a resonant wavelength of approximately 1.54$\mu$ within the gap created by PBG features 410 ... 497. Transmission at wavelengths above and below the resonant wavelength within the band gap wavelength range is highly attenuated, such as the spectral response shown in FIG. 1(*b*).

Increasing the defect length 499 shifts the resonant wavelength to higher value and also reduces the PBG cavity's 402 Q by increasing the effective refractive index of the PBG cavity 402, as seen by the resonant mode. Similarly, decreasing the defect length 499 produces the opposite results. Thus, the resonant wavelength of the PBG structure may be shifted by changing the defect length 499. Similarly, the resonant wavelength may be altered by changing the size defect or the refractive index of the material comprising the refractive index defect.

In FIG. 4, a spacing defect is shown in a rectangular PBG array, whereby the spacing 498 between all features is the same in both the x and y direction, except for the spacing 499 in the x direction between the fourth and fifth column of features. Between these two columns, a periodicity defect in the otherwise periodically spaced features 410 ... 497 is positioned within the waveguide 403 to create an allowed photonic state within the band gap.

However, an appropriately designed TLIR 400 may operate even if the PBG 402 has no defect leading to a corresponding resonant PBG transmission peak within the band gap. For example, if the resonant wavelength for the first and second SWS gratings 407/408 coincides with an allowed state located at the PBG band edge, such as approximately 1300 nm or 1700 nm, as shown in FIG. 1(*b*), TLIR 400 will exhibit a transmission resonance at a wavelength approximately equal to the selected band edge wavelength.

PBG structures 402 exhibit primarily longitudinal resonances, sustaining propagating modes along the length of the cavity in a direction parallel to the incident wave 418. Single mode PBG 402 resonances are realized by placing a single layer of uniform PBG features 410 ... 497 such as holes, to extend substantially through the thickness of the waveguide material 403, effectively creating a 2 dimensional (2D) structure. A single lowest order propagating mode, $TEM_{00}$, corresponds to a single photon path and a nearly gaussian energy density pattern centered near the TLIR cavity's 400 core, the ray having a wavelength equal to the cavity's resonant wavelength. A waveguide thickness less than approximately 0.5 resonant wavelengths generally becomes too attenuating.

In instances when cladding layer 404 is used, depending on the relative refractive indexes of the waveguide 403, the cladding layer 404 and the PBG features 410 . . . 497 material, it may be desirable to extend the PBG features 410 . . . 497 into the cladding layer 404 as shown in FIG. 4 to help avoid localized refractive index inversion regions. A localized refractive index inversion region is a region where the localized refractive index of the cladding layer 404 exceeds the effective refractive index of the waveguide 403. If this inversion condition results, the operation of the TLIR 400 may be degraded due to significant electromagnetic energy escaping the waveguide in favor of the higher relative refractive index cladding layer 404. If the nominal waveguide 403 refractive index is only slightly greater than that of the cladding layer 404, introduction of PBG features 410 . . . 497 can result in the cladding layer 404 having a higher refractive index than the waveguide 403 in waveguide regions that surround PBG features 410 . . . 497. Etching PBG features 410 . . . 497 into the cladding layer 404 can reduce the effective refractive index of the cladding layer 404 in the vicinity of PBG features 410 . . . 497 to help avoid a refractive index inversion.

As shown by FIGS. 3(*b*) and 3(*c*), separating two broadband SWS mirrors such as 407 and 408 an optical path length equal to an integral number of half wavelengths results in a device that transmits nearly 100% over a very narrow range of wavelengths determined by the optical path length between the SWS mirrors 407/408. For TLIR 400, it is preferable that the individual SWS grating structures 407 and 408 have broadband resonances over the wavelength range of interest. Based on superposition of separate simulations of (i) SWS mirror 407/408 and (ii) PBG 402, TLIR 400 has essentially the same transmission resonance characteristics as the SWS mirrors shown in FIGS. 3(*b*) and 3(*c*).

If SWS gratings 407 and 408 operated as narrowband mirrors as described by Grann, it would difficult to successfully fabricate a functional TLIR 400 exhibiting resonant narrowband transmitter characteristics. By designing individual SWS structures 407 and 408 to function as broadband reflectors, the optical resonator formed by SWS mirrors 407/408 is simply determined by the optical distance between the two SWS gratings 407 and 408. Thus, SWS gratings 407/408 exhibit a narrow transmission peak at a wavelength determined almost exclusively by the spacing between the SWS gratings 407/408 and the effective refractive index of the waveguide material 403. Transmission resonances for SWS gratings 407/408 are primarily transverse to the propagation direction of the photon beam, coupling the incident wave into the plane of the grating material.

The spacing between SWS gratings 407/408 and the features positioned in the outermost PBG 402 columns, such as 440 and 447, should be controlled to avoid undesirable effects. Ideally, the spacing between SWS gratings, such as 408 and outermost features, such as feature 440, should be substantially the same as the nominal feature spacing between PBG features 498. By setting this distance 419 equal to the PBG feature spacing 498, the waveguide material 403 in this region is maintained at substantially the same effective refractive index as near PBG features not positioned in an outermost column, such as 421. A different distance 419 can result in a different effective refractive index in this region and cause undesirable effects such as Fresnel reflections.

Individual TLIR structures 400 may be hooked up in series, in parallel, or in combination of series and parallel connections. TLIRs 400 may also be connected to other optical or electronic components, preferable on the same die. There may be some applications for multi-mode TLIR 400 waveguides that provide spatial filtering/modulation of selected higher order modes that reside, energy-wise, away from the center of the TLIR 400 waveguide and closer to the cladding 404. Waveguide 403 thicknesses of approximately at least 1 resonant wavelength is generally required to support higher order modes in addition to the most compact propagation mode, $TEM_{00}$. In the TLIR 400 shown in FIG. 4, the cladding generally consists of air 406 on one side and the cladding layer 404 on the other. This is analogous to a graded index fiber where the refractive index within the core is varied to achieve performance with multimode (larger) fiber more in line with that of single mode fiber by essentially doing mode selection.

Using a TLIR 400 cavity, multi-mode waveguides may be produced by forming appropriate 3 D PBG structures. For example, 3D structures allowing multimode operation may be realized by increasing the waveguide thickness to at least approximately 1 resonant wavelength and including PBG features 410 . . . 497 which do not extend through the entire waveguide thickness, or by positioning PBG features near the cladding layer 404 different from PBG features positioned near the cavity core. PBG hole periodicity, notwithstanding the possible presence of a PBG defect, is critical whether a single mode or multi-mode cavity is formed.

The particular manufacturing process used for fabricating the TLIR 400 should preferably be inexpensive and reproducible. Conveniently, both the PBG 402 and SWS gratings 407 and 408 of the present invention can be carried out by using any standard integrated optics manufacturing or electronic integrated circuit manufacturing method. TLIR 400 may occupy areas as small as approximately 20 square microns for a center wavelength of approximately $1.35\mu$.

Operation of the TLIR 400 may be affected by heat generated in the cavity which may change the cavity's dimensions. In order to maintain dimensional stability in situations where TLIR 400 encounters power levels which may create dimensional anomalies, classical methods of thermoelectric cooling can be utilized. For example, assuming TLIR is positioned on a bulk substrate material die, a Peltier cell can be thermally connected generally to the backside of the die to lend temperature control to TLIR 400. Whenever the grating temperature exceeds a certain amount, the Peltier cell functions to cool the TLIR 400 via conventional thermoelectric means.

The invention permits a high packing density. The resonant structure is thin being only about ½ to 1 resonant wavelength thick for single mode operation and may be only several wavelengths wide and several wavelengths long, thus permitting a high packing density. For example, for a resonant wavelength of $1.5\mu$, the required area for TLIR 400 may be as little as 15 to 20 square microns. It is conceivable multiple TLIR 400 structures can also be fabricated on top of one another, further increasing density. High packing densities allow a plurality of TLIRs 400 to be produced on a plurality die that are produced on a given bulk substrate material, such as silicon or galium arsenide.

Each TLIR 400 can be designed or tuned to a particular wavelength, enabling the processing of multi-wavelength input signals. The invention also permits simultaneous fabrication of electronic or other optical components on the same bulk substrate material die, such as an electronic oscillator for electro-optic applications such as modulation or switching.

One of the advantages in combining PBG 402 and SWS gratings 407/408. is the ability to introduce external substances (gases, liquids, etc.) via the PBG features 410 . . . 497, such as holes, into the highly resonant guided wave microcavity. Thus, applications such as low power gas lasers and spectroscopy cells become viable in very small areas. For instance, in a typical gas-sampling cell where substances are introduced for spectroscopy, the length of the cell dictates the sensitivity of the measurement. By making a resonant microcavity with a high Q, the "effective path length" can be made equivalent to the large cells, thus providing high sensitivity in a small package volume. With lasers, the effective volume in the cavity is proportional to the power and a high Q resonant microcavity can have similar power in correspondingly smaller cavities.

The high Q TLIR 400 microcavity is a highly guided microcavity due to the combined waveguiding effects produced by combining PBG 402 and the resonator formed by SWS mirrors 407/408. The highly guided microcavity formed by combining the filtering of PBG 402 and filtering of the resonator formed by SWS mirrors 407/408 reduces the signal noise of light output by TLIR 400 beyond the signal noise levels possible through use of PBG 402 alone. Thus, TLIR 400 may be used to condition optical signals and supply high signal to noise ratio optical beams for a variety of uses, such as optical data communications.

Figure 5:
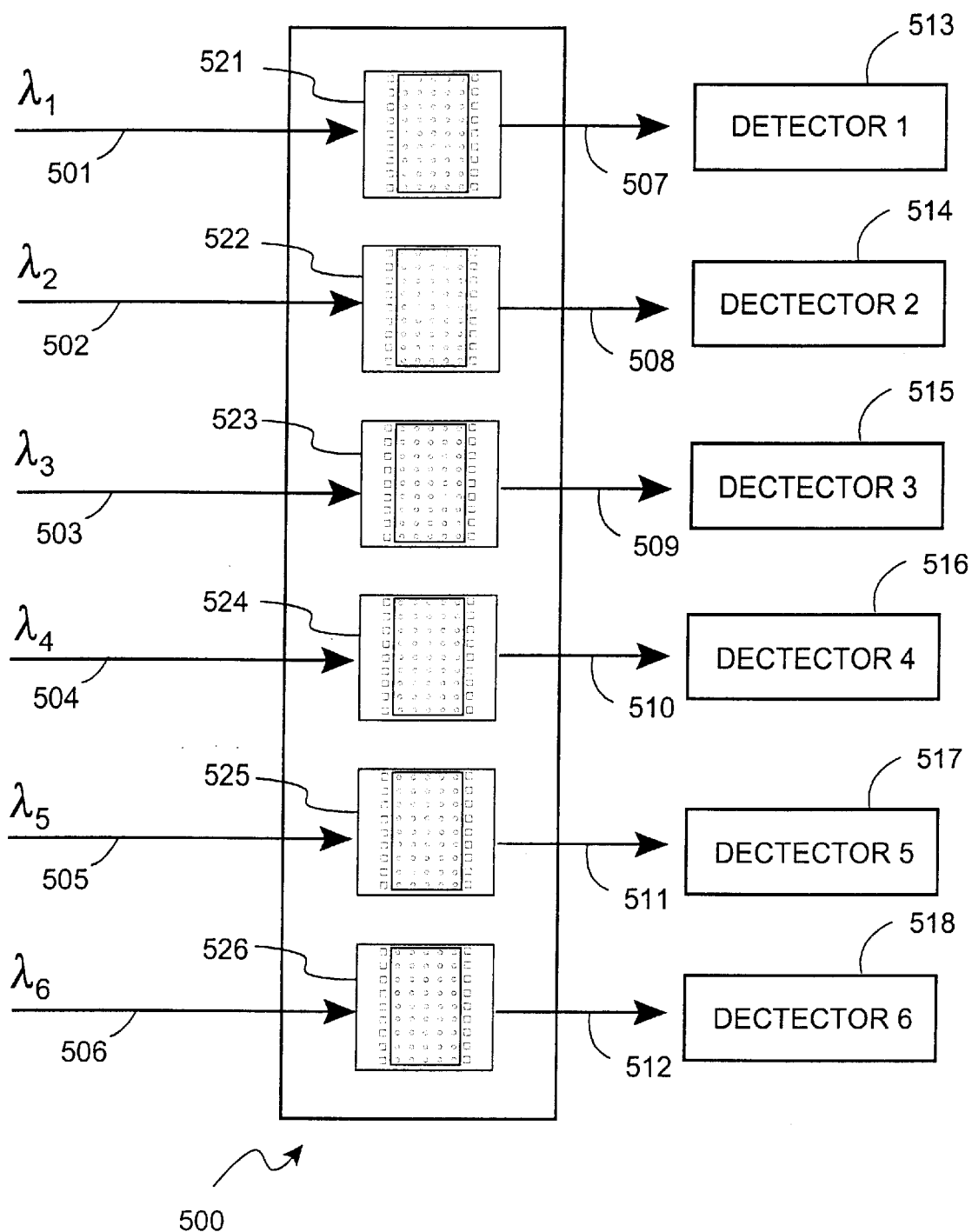
FIG. 5 illustrates a perspective view of a gas detector, formed from a plurality of TLIRs, according to the present invention.

TLIR 400 may be used for many other purposes. For example, multiple TLIRs 400 having varied transmission resonances may be placed in proximity, preferably on a single die, to realize a gas detector. PBG features 410 . . . 497 allow gas to enter TLIR 400 cavities. If multiple TLIRs 400 are used, gas may be introduced simultaneously to all such TLIRs 400. TLIRs may be designed to resonate at chosen wavelengths, each TLIR 400 resonating at a wavelength corresponding to at least one line in the absorption of a desired gas to be identified. The gas detector 500 shown in FIG. 5 may be used to identify gases by utilization of the characteristic absorption spectrum of a given gas, corresponding to electronic transitions between discrete permitted energy levels for the gas or gases to be detected. For example, multiple TLIRs 521–526 supporting varied lasing lines may be placed in proximity, preferably on a single die, to realize a gas detector 500. Light sources 501–506 supply six separate light wavelengths λ1 . . . λ6 to TLIR 521–526, respectively. TLIR 521–526 are designed to have a narrow transmission resonances centered at λ1 . . . λ6, respectively. Although six TLIRs 521–526 are shown in FIG. 5, the invention is not limited and may contain many more than six, or possible less than six TLIRs.

If one or more detectors 513–518 no longer detects light 507–512, or detect an attenuated beam transmitted through one or more TLIRs 521–526, an absorption has occurred. Each TLIR 521–526 is preferably coupled to its own optical detector 513 . . . 518, such as a thin-film micro bolometer for detection of transmitted light. Compiling resulting non-transmitting TLIR 521–526 as detected by detectors 513–518 due to the introduction of one or more gases allows the identification of the one or more gases.

Individual components need not be formed in the disclosed shapes, or assembled in the disclosed configuration, but could be provided in virtually any shape and assembled in virtually any configuration. Further, the individual components need not be fabricated from the disclosed materials, but could be fabricated from virtually any suitable materials. Further, although the TLIR 400 structure described herein is a physically separate module, it will be manifest that TLIR 400 may be easily integrated into integrated circuits. Furthermore, all the disclosed elements and features of each disclosed embodiment can be combined with, or substituted for, the disclosed elements and features of every other disclosed embodiment except where such elements or features are mutually exclusive.

What is claimed is:

1. A transverse-longitudinal integrated optical resonator (TLIR), comprising:
    a waveguide;
    a first and a second subwavelength resonant grating in said waveguide, and
    a photonic band gap resonant structure (PBG) having a plurality of features in said waveguide, said PBG positioned between said first and second subwavelength resonant gratings.

2. The TLIR of claim 1, wherein said first and second subwavelength resonant gratings and said PBG features are embedded in said waveguide.

3. The TLIR of claim 1, wherein said waveguide is at least one selected from the group consisting of Si, Ge, ZnSe, $BaF_2$, CdTe, $LiNbO_3$ and SBN.

4. The TLIR of claim 1, wherein said waveguide is formed from at least one electro-optic material.

5. The TLIR of claim 4, wherein said electro-optic waveguide material is at least one selected from the group consisting of CdTe, $LiNbO_3$ and SBN.

6. The TLIR of claim 1, wherein said waveguide is a substantially planar waveguide, and further comprising at least one cladding layer positioned adjacent to said substantially planar waveguide.

7. The TLIR of claim 6, wherein said waveguide is formed from an electro-optic material and said at least one cladding layer comprises at least one lower buffer layer positioned under said waveguide and at least one upper buffer layer positioned over said waveguide.

8. The TLIR of claim 7, further comprising a pair of electrically conductive discharge electrodes, wherein said waveguide is positioned between said electrically conductive discharge electrodes, said electrically conductive discharge electrodes being separated from said waveguide by said buffer layers.

9. The TLIR of claim 8, further comprising a bulk substrate material and a RF oscillator, wherein said RF oscillator is formed on said bulk substrate material and is electrically connected to said electrically conductive discharge electrodes.

10. A method for transforming an electromagnetic signal which comprises utilizing the apparatus of claim 9, wherein utilizing includes optical computing.

11. A method for transforming an electromagnetic signal which comprises utilizing the apparatus of claim 9, wherein utilizing includes optical signal modulation.

12. The TLIR of claim 6, wherein said at least one cladding layer has a lower index of refraction than said waveguide.

13. The TLIR of claim 12, wherein said cladding layer is at least one selected from the group consisting of glasses and $BaF_2$.

14. The TLIR of claim 1, wherein said plurality of PBG features comprise at least one row of PBG features having at least one defect therein.

15. The TLIR of claim 14, wherein said defect is at least one selected from the group consisting of a spacing defect, a size defect and a refractive index defect.

16. The TLIR of claim 15, wherein said PBG features are holes.

17. The TLIR of claim 16, wherein said holes are filled with at least one gas.

18. The TLIR of claim 17, wherein said gas is air.

19. The TLIR of claim 14, wherein said PBG features are arranged in linear arrays.

20. The TLIR of claim 14, wherein a resonator formed by said first and second resonant gratings have a first transmission resonance and said PBG has a second transmission resonance, wherein said transmission resonances are substantially equal.

21. The TLIR of claim 20, wherein said resonator sustains substantially only one propagating mode.

22. The TLIR of claim 20, wherein said resonator sustains more than one propagating mode.

23. The TLIR of claim 1, wherein each said subwavelength resonant grating structure comprises a substantially periodic array of SWS features.

24. The TLIR of claim 23, wherein said SWS features from said first and second resonant grating are arranged in substantially linear arrays.

25. The TLIR of claim 24, wherein said SWS features from said first and second resonant grating are arranged along arcs having a radius of curvature.

26. The TLIR of claim 24, wherein said SWS features are formed from a material having a refractive index higher than that of a material comprising said waveguide.

27. The TLIR of claim 26, wherein said SWS features are formed from at least one selected from the group consisting of Ge, $BaF_2$, $LiNbO_3$, SBN and Si.

28. The TLIR of claim 1, wherein said PBG features are arranged along arcs having a radius of curvature.

29. The TLIR of claim 1, further comprising a structure for cooling.

30. The TLIR of claim 1, further comprising a bulk substrate material having a plurality of die, each said die having at least one electronic device, wherein said TLIR is positioned on said die.

31. The TLIR of claim 30, wherein said TLIR is communicably connected to one or more of said electronic devices.

32. A method for transforming an electromagnetic signal which comprises utilizing the apparatus of claim 1, wherein utilizing includes wavelength division de-multiplexing.

33. A composite optical resonator, comprising at least two transverse-longitudinal integrated optical resonators (TLIR) connected in series, each TLIR comprising:
    a waveguide;
    a first and second subwavelength resonant grating structure in said waveguide, and
    a photonic band gap resonant structure (PBG) having a plurality of features in said waveguide, wherein said PBG is positioned between said first and second subwavelength resonant grating structures.

34. A composite optical resonator, comprising at least two transverse-longitudinal integrated optical resonators (TLIR) connected in parallel, each TLIR comprising:
    a waveguide;
    a first and second subwavelength resonant grating structure in said waveguide, and
    at least one photonic band gap resonant structure (PBG) having a plurality of features in said waveguide, wherein said PBG is positioned between said first and second subwavelength resonant grating structure.

35. A gas detector, comprising a plurality of transverse-longitudinal integrated optical resonators (TLIR) connected in parallel, comprising:
    a waveguide;
    a first and second subwavelength resonant grating structure in said waveguide, and
    at least one photonic band gap resonant structure (PBG) having a plurality of features in said waveguide, said PBG positioned between said first and second subwavelength resonant grating structure, wherein said plurality of TLIRs exhibit transmission resonances centered at more than one wavelength.

36. The gas detector of claim 35, further comprising a bulk substrate material having a plurality of die, each said die having at least one electronic device, wherein said gas detector is positioned on said die.

37. A method for tuning a transmission resonance of a transverse-longitudinal integrated optical resonator (TLIR) comprising the steps of:
    providing a first and second subwavelength resonant grating structure in a waveguide, said first and second subwavelength resonant grating structure having a first resonant transmission wavelength;
    providing a photonic band gap resonant structure (PBG) in said waveguide, said PBG positioned between said first and second subwavelength resonant grating structures, said PBG having a second resonant transmission wavelength, and
    tuning at least one of said transmission resonances to result in said transmission resonance wavelengths being substantially equal.

38. The method for tuning the TLIR of claim 37, wherein following said tuning, a nominal transmission resonance wavelength ($\lambda$) divided by a difference between said PBG transmission resonance wavelength and said transmission resonance wavelength of said first and second subwavelength resonant gratings is less than a square root of the product of a Q of said PBG Q and a Q of said first and second subwavelength resonant gratings.

39. The method for tuning the TLIR of claim 38, wherein following said tuning, a nominal transmission resonance wavelength ($\lambda$) divided by a difference between said PBG transmission resonance wavelength and said transmission resonance wavelength of said first and second subwavelength resonant gratings is less than one half a square root of the product of a Q of said PBG Q and a Q of said first and second subwavelength resonant gratings.

40. The method for tuning the TLIR of claim 37, wherein said tuning is at least one selected from the group of electo-optic, photo-refractive, thermal, magneto-optic and tilting.

41. A method of forming a transverse-longitudinal integrated optical resonator (TLIR) in a waveguide, comprising the steps of:
    providing a first and second subwavelength resonant grating structure in said waveguide, and
    providing a photonic band gap resonant structure (PBG) having a plurality of features in said waveguide, wherein said PBG is positioned between said first and second subwavelength resonant grating structure.

42. A method of forming a transverse-longitudinal integrated optical resonator (TLIR) in a waveguide positioned on a bulk substrate material, said bulk substrate material having a plurality of die, comprising the steps of:
    selecting said die;
    providing a first and second subwavelength resonant grating structure in said waveguide, and
    providing a photonic band gap resonant structure (PBG) having a plurality of features in said waveguide, wherein said PBG is positioned between said first and second subwavelength resonant grating structure.

43. The method of forming a TLIR of claim 42, further comprising a step of planarizing said waveguide.

44. The method of forming a TLIR of claim 43, further comprising the step of providing at least one cladding layer, said at least one cladding layer formed over said bulk substrate material.

45. The method of forming a TLIR of claim 44, wherein said at least one cladding layer comprises at least one lower buffer layer under said waveguide and at least one upper buffer layer over said waveguide.

46. The method of forming a TLIR of claim 45, further comprising the steps of forming a first electrically conductive film over said at least one lower buffer layer and forming a second electrically conductive film over said at least one upper buffer layer, said electrically conductive films each forming electrically conductive discharge electrodes, wherein said waveguide is positioned between said electrically conductive discharge electrodes, said electrically conductive discharge electrodes being separated from said waveguide by said buffer layers.

47. The method of forming a TLIR of claim 46, further comprising the step of forming an RF oscillator on said bulk substrate material, said RF oscillator being electrically connected to said electrically conductive films.

\* \* \* \* \*